United States Patent
Wischgoll et al.

(10) Patent No.: US 12,482,993 B2
(45) Date of Patent: Nov. 25, 2025

(54) ELECTRICAL SOCKET WITH SWITCH TO PREVENT ELECTRICAL ARC IN EXPLOSIVE ENVIRONMENTS

(71) Applicant: EATON INTELLIGENT POWER LIMITED, Dublin (IE)

(72) Inventors: Lars Wischgoll, Eberbach (DE); Michael Ketterer, Soest (DE); Toni Christian Ott, Neckargemünd (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 516 days.

(21) Appl. No.: 17/792,588

(22) PCT Filed: Jan. 14, 2021

(86) PCT No.: PCT/EP2021/025007
§ 371 (c)(1),
(2) Date: Jul. 13, 2022

(87) PCT Pub. No.: WO2021/144146
PCT Pub. Date: Jul. 22, 2021

(65) Prior Publication Data
US 2023/0059245 A1   Feb. 23, 2023

(30) Foreign Application Priority Data

Jan. 14, 2020 (DE) .......................... 102020100655.1

(51) Int. Cl.
*H01R 13/707* (2006.01)
*H01R 13/53* (2006.01)
(Continued)

(52) U.S. Cl.
CPC ........... *H01R 13/707* (2013.01); *H01R 13/53* (2013.01); *H01R 13/629* (2013.01);
(Continued)

(58) Field of Classification Search
CPC .... H01R 13/707; H01R 13/53; H01R 13/629; H01R 24/005; H01R 24/86; H01R 13/641;
(Continued)

(56) References Cited

U.S. PATENT DOCUMENTS 5,680,926 A * 10/1997 Sandor ................. H01R 13/625
200/50.11
6,053,756 A * 4/2000 Flanigan .............. H01R 13/707
439/911
(Continued)

FOREIGN PATENT DOCUMENTS

CN   107681319   2/2018
DE   202006003433   7/2007
(Continued)

OTHER PUBLICATIONS

International Search Report & Written Opinion; Corresponding PCT Application No. PCT/EP2021/025007; Authorized Officer Segura Mateo; May 21, 2021.

*Primary Examiner* — Justin M Kratt
(74) *Attorney, Agent, or Firm* — Squire Patton Boggs US LLP

(57) ABSTRACT

A plug and socket assembly (100) includes a socket (110) with a receptacle portion (113) configured to receive an electrical plug (105) and an interlock mechanism (130) configured to retain the electrical plug (105) in the receptacle portion (113) when the receptacle portion (113) is rotated about a first axis to a first position. The assembly (100) includes an electrical switch (140) including an actuator (145) operable to energize and de-energize the socket (110). The assembly (100) includes a transfer mechanism (150) having a first mechanical component (310, 410) operable to transfer the rotation of the receptacle portion (113)

(Continued)

into motion relative to the first axis that operates the actuator (145). Methods of operating a plug and socket assembly (100) are also provided.

11 Claims, 10 Drawing Sheets

(51) Int. Cl.
    *H01R 13/629*      (2006.01)
    *H01R 24/00*      (2011.01)
    *H01R 24/86*      (2011.01)
    *H01R 13/641*      (2006.01)
    *H01R 13/70*      (2006.01)
    *H01R 13/703*      (2006.01)
    *H01R 13/71*      (2006.01)
    *H01R 13/713*      (2006.01)

(52) U.S. Cl.
    CPC ........... *H01R 24/005* (2013.01); *H01R 24/86* (2013.01); *H01R 13/641* (2013.01); *H01R 13/70* (2013.01); *H01R 13/7038* (2013.01); *H01R 13/71* (2013.01); *H01R 13/713* (2013.01)

(58) Field of Classification Search
    CPC .... H01R 13/70; H01R 13/7038; H01R 13/71; H01R 13/713
    See application file for complete search history.

(56) References Cited

U.S. PATENT DOCUMENTS

| | | | |
|---|---|---|---|
| 7,537,472 B1 | 5/2009 | Schwarz et al. | |
| 2018/0062306 A1* | 3/2018 | Juds | ................ H01R 13/62977 |

FOREIGN PATENT DOCUMENTS

| | | | |
|---|---|---|---|
| DE | 202006003433 U1 * | 8/2007 | ........... H01R 13/707 |
| DE | 102018105486 | 9/2019 | |
| DE | 102018105510 | 9/2019 | |
| EP | 1208619 B1 | 7/2005 | |
| EP | 1344286 B1 | 6/2010 | |
| JP | S5966074 | 4/1984 | |

\* cited by examiner

ELECTRICAL SOCKET WITH SWITCH TO PREVENT ELECTRICAL ARC IN EXPLOSIVE ENVIRONMENTS

FIELD OF INVENTION

The present disclosure relates to electrical sockets. More specifically, the present disclosure relates to electrical sockets with integrated switches.

BACKGROUND

Electric power can be supplied from an active device (e.g., power source) to a passive device (e.g., load source). For example, power stations can generate electric power, electric power companies can supply the electric power through an electric circuit (e.g., electric power grid) to consumers, and consumers can employ one or more devices to convert the electric power into energy to accomplish a variety of objectives. Consumers of electricity include household and residential consumers as well as commercial and industrial consumers.

Electrical plug and socket assemblies include an electrical socket (e.g., receptacle) and an electrical plug (e.g., electrical connector). A power source supplies electrical current to the electrical socket, and the electrical plug provides electrical current to a load source. The electrical plug is configured to connect to and disconnect from the electrical socket, whereby electrical current from the power source can be provided to the load source based on the electrical connection between the socket and the plug.

Electrical plug and socket assemblies may be employed for a variety of applications in a variety of environments. Some environments and applications present a risk of explosion or fire from an electrical arc or spark that may occur when connecting or disconnecting the plug to or from an electrically energized socket. Such risk is reduced when connecting or disconnecting the plug to or from an electrically de-energized socket. Accordingly, for safe and effective distribution of electric power, an electrical socket with a switch for controlling energization of electrical current in an electrical plug and socket assembly is needed.

SUMMARY

In one embodiment, a plug and socket assembly includes a socket with a receptacle portion configured to receive an electrical plug and an interlock mechanism configured to retain the electrical plug in the receptacle portion when the receptacle portion is rotated about a first axis to a first position. The assembly includes an electrical switch including an actuator operable to energize and de-energize the socket. The assembly includes a transfer mechanism having a first mechanical component operable to transfer the rotation of the receptacle portion into motion relative to the first axis that operates the actuator.

In another embodiment, an electrical socket includes a receptacle portion configured to connect to an electrical plug and a shaft rotatable about a first axis based on rotation of the receptacle portion about the first axis. The electrical socket includes a first gear coupled to the shaft and a second gear coupled to the first gear. The first gear is rotatable in a first direction about the first axis based on rotation of the shaft, and the second gear is rotatable in a second direction about a second axis oriented at an angle relative to the first axis based on rotation of the first gear.

In yet another embodiment, a method of operating a plug and socket assembly includes connecting a plug to a receptacle portion of a socket and rotating the plug in a first direction about a first axis. The rotating rotates a first mechanical component in the first direction about the first axis and a second mechanical component in a second direction about a second axis oriented at an angle relative to the first axis. Rotation of the second mechanical component rotates a third mechanical component in the second direction about the second axis. The third mechanical component operates an actuator of an electrical switch to energize and de-energize the socket.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
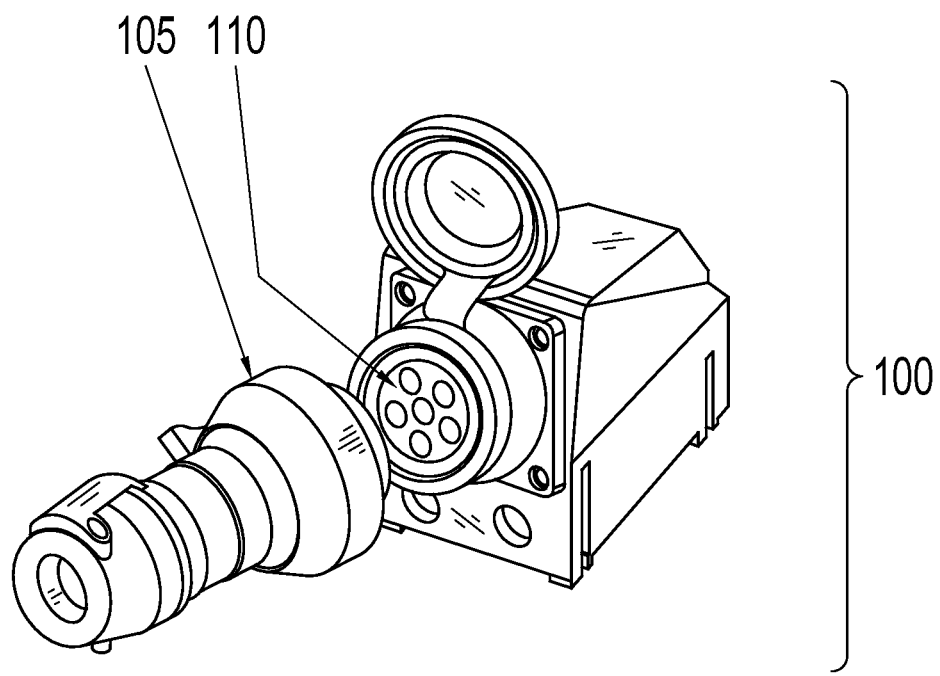
FIG. 1 is a perspective view of one embodiment of a plug and socket assembly.

Electrical plug and socket assemblies supply electric power to various pieces of equipment and machines in a variety of environments for a variety of applications. FIG. 1 is an exemplary plug and socket assembly 100 including a plug 105 and a socket 110.

For purposes of the disclosure, the electrical assembly 100 may be described as being employed in hazardous environments with the understanding that the electrical assembly 100 finds utility and can be employed in both hazardous and non-hazardous environments. Hazardous conditions can arise in environments where combustible material (e.g., gas, vapor, or dust) and/or volatile or corrosive chemicals (e.g., water, oil) are present. Electrical plug and socket assemblies 100 employed in hazardous conditions may carry high voltage electrical currents when energized.

Figure 2:
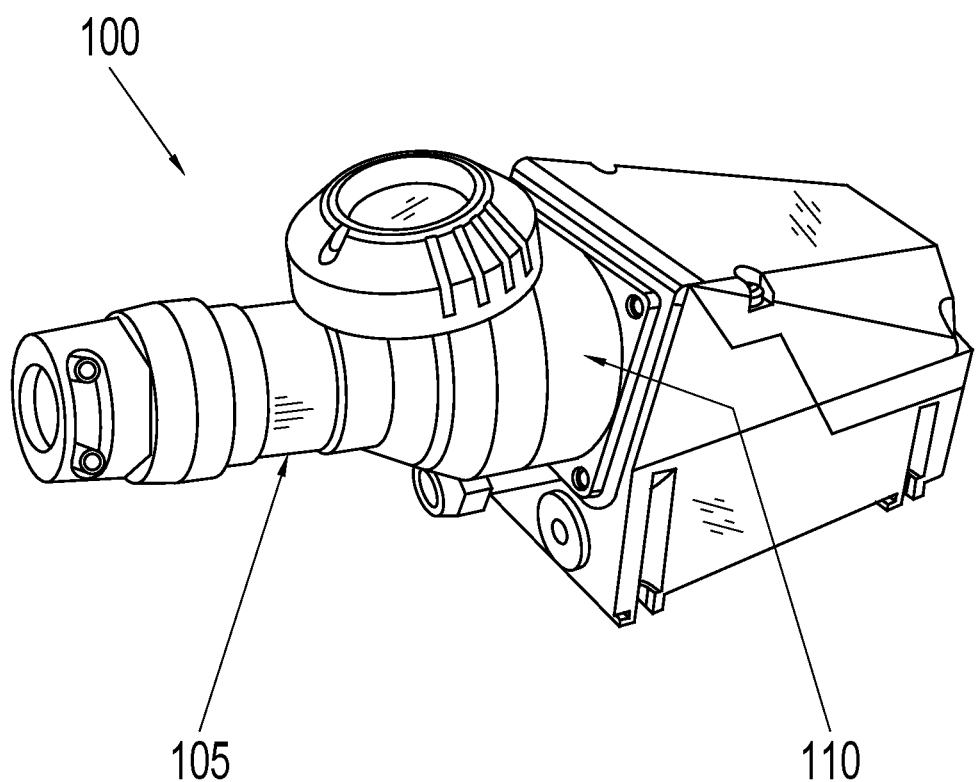
FIG. 2 is a perspective view of the plug and socket assembly of FIG. 1 showing the plug connected to the socket.

The plug 105 is disconnected from the socket 110 in FIG. 1. In FIG. 2, the plug 105 is connected to the socket 110. When connected and energized, a power source (not shown) supplies electrical current to the electrical socket 110, and the electrical plug 105 provides the electrical current to a load source (not shown).

Figure 3:
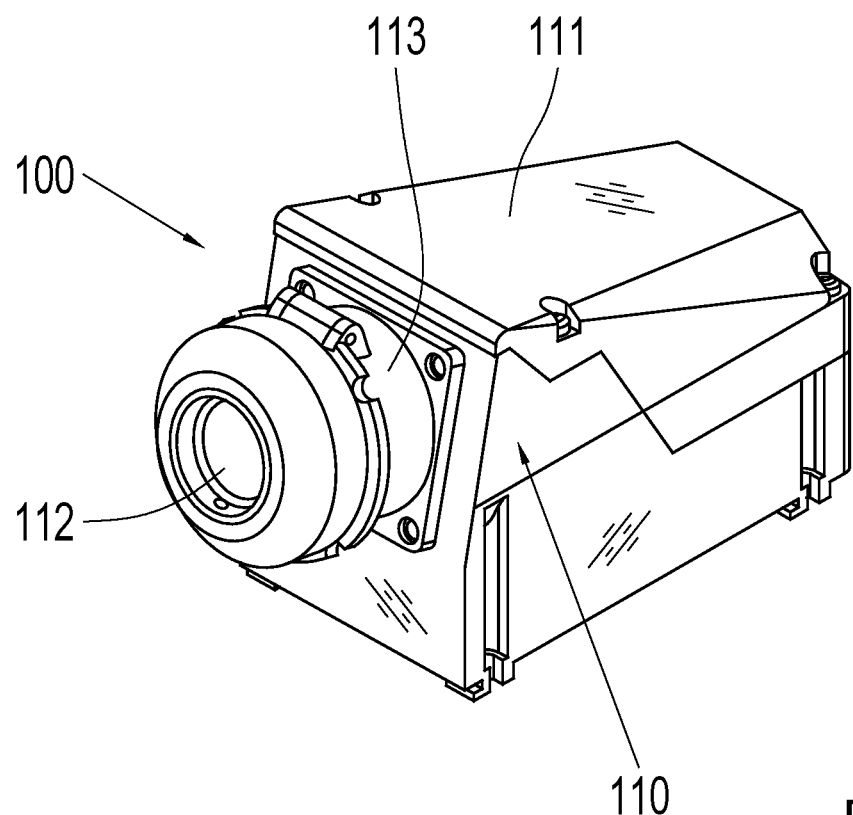
FIG. 3 illustrates a perspective view of the socket of FIG. 1 with a cap closed to cover the receptacle portion of the socket.

The electrical plug and socket assembly 100 includes several safety features. FIG. 3 illustrates a perspective view of the socket 110 including a housing 111 and a cap 112. The housing 111 and cap 112 enclose internal components of the socket 110 and isolate or seal the internal components from dirt, debris, liquid, gas, and other contaminants, including hazardous materials. For example, the cap 112 can selectively cover the receptacle portion 113 of the socket 110 when the plug 105 is not connected to the receptacle 113.

Additionally the housing 111 and the cap 112 are constructed to withstand impact and contain an electric arc or spark within the housing 111 of the socket 110. For example, the housing 111 and the cap 112 can be manufactured from an impact resistant material, such as metal or hard plastic, and the shape of the component can be constructed to be a single piece or, if multiple pieces, to have reinforced fasteners or adhesive to tightly seal and bond mating pieces together. Thus, the housing 111 and the cap 112 are constructed to withstand impact and contain an electric discharge, thereby preventing ignition of combustible material present in the atmosphere of the environment in which the assembly 100 is employed. The cap 112 may be dimensioned such that there is an air gap between the receptacle 113 and the surfaces of the cap 112.

Figure 4:
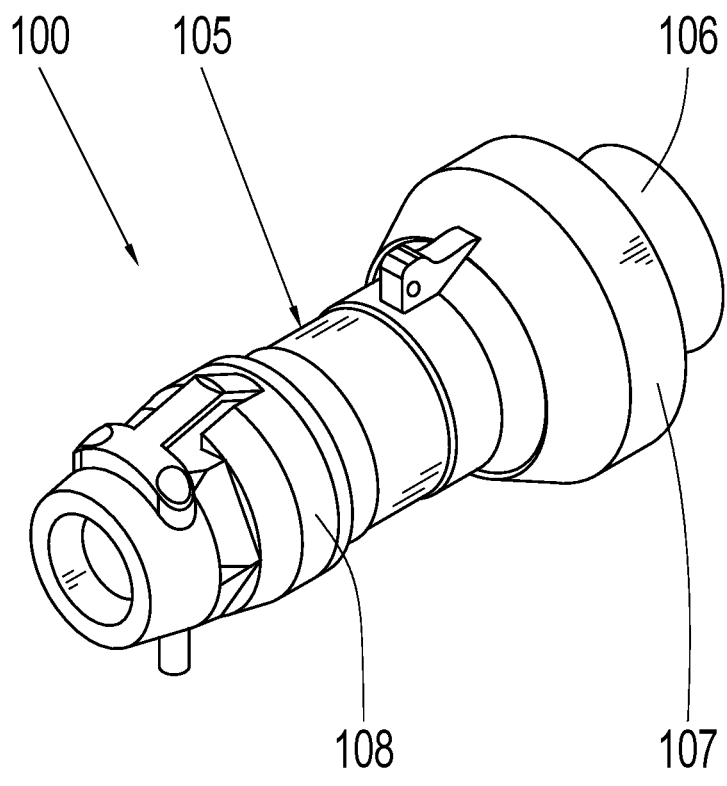
FIG. 4 illustrates a perspective view of the plug of FIG. 1.

As shown in FIG. 4, the plug 105 has a body portion 108 that is manufactured from an impact resistant material, such as metal or hard plastic and is constructed to be a single piece or, if multiple pieces, to have reinforced fasteners or adhesive to tightly seal and bond mating pieces together. The plug 105 includes a collar 106 and outer flange 107 that are configured to mate with the receptacle portion 113 of the socket 110 and provide a reliable, secure connection between the plug 105 and the socket 110.

Figure 5:
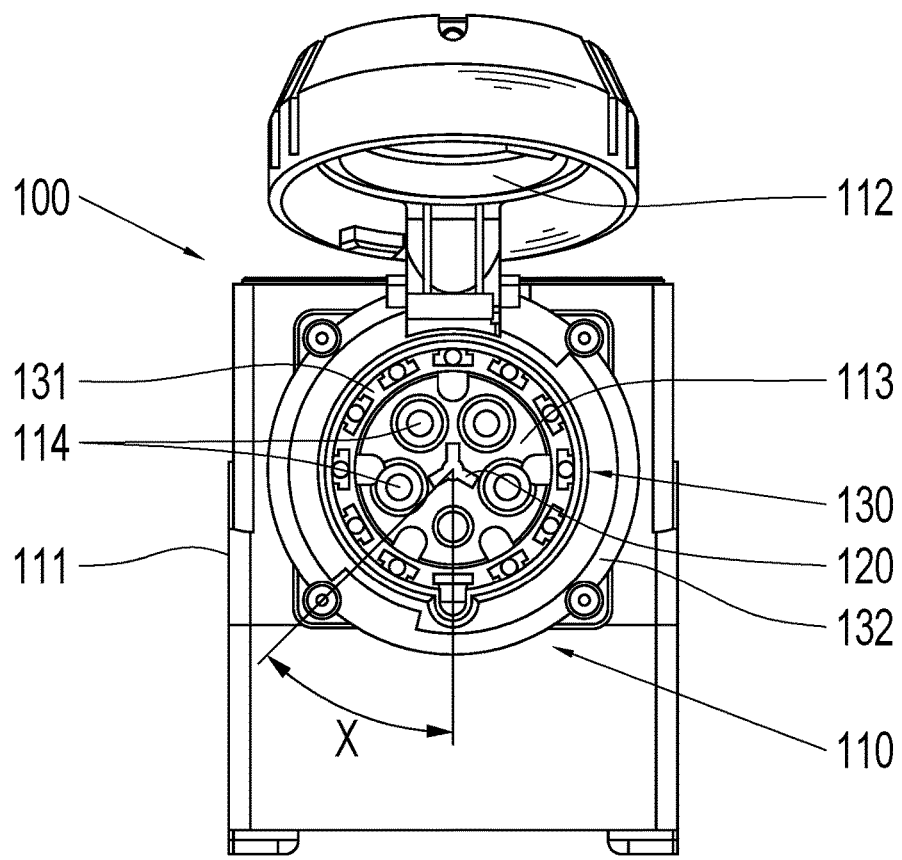
FIG. 5 shows a front view of the socket of FIG. 3 with the cap opened to show the receptacle portion of the socket.
Figure 6:
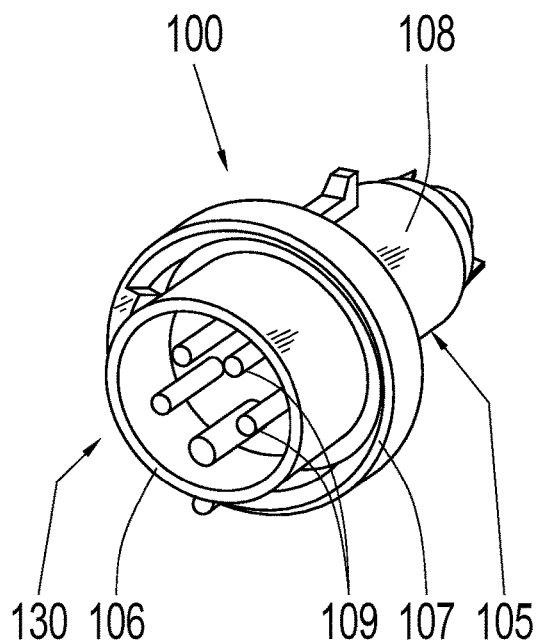
FIG. 6 is a front perspective view of the plug of FIG. 4 configured to connect to the receptacle portion of the socket of FIG. 5.
Figure 7:
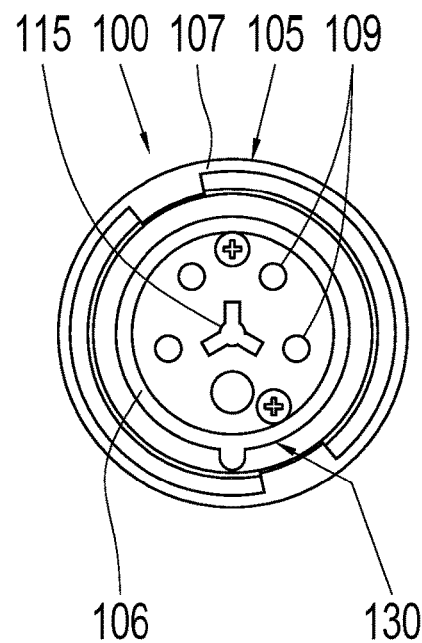
FIG. 7 illustrates a front view of the plug of FIG. 6 showing a recess configured to mate with a protrusion on the socket of FIG. 5.

FIG. 5 illustrates a front view of the socket 110 with the cap 112 in an open position to uncover the receptacle portion 113 of the socket 110. As shown, the receptacle portion 113 includes one or more electrical openings 114 configured to receive one or more electrical prongs 109 of the plug 105. FIG. 6 is a perspective view of the plug 105 showing the electrical prongs 109 surrounded by the collar 106. FIG. 7 illustrates a front view of the socket 105 including the electrical prongs 109. When the plug 105 is connected to the socket 110, the electrical prongs 109 of the plug 105 engage the electrical openings 114 of the socket 110 and provide an electrical connection between the plug 105 and the socket 110.

Connecting or disconnecting the plug 105 to or from an energized socket 110 in a hazardous condition creates a risk of electrical arc or spark that could result in an explosion or fire. To reduce or prevent the risk of electrical arc or spark, it may be desirable to de-energize the electrical socket 110 when connecting or disconnecting the electrical plug 105. Electrical switches may be used to selectively energize or de-energize an electrical socket 110. Electrical switches can include mechanical, electromechanical, and electrical components that selectively make and break an electrical circuit. Electrical switches can thus be operated mechanically, electro-mechanically, and electrically to selectively make an electrical circuit, thereby energizing the electrical socket 110, or break an electrical circuit, thereby de-energizing the electrical socket 110.

The plug and socket assembly 100 can include additional safety features. In some embodiments, the electrical socket 110 can be configured to accept only a predetermined-type of plug 105. For example, as shown in FIG. 5, the socket 110 may include a protrusion 120 having a predetermined profile selected to mate with a recess 115 (shown in FIG. 7) on the plug 105 having a corresponding predetermined profile. In such instances, when connecting the plug 105 to the socket 110, the recess 115 of the plug 105 mates with the protrusion 120 of the socket 110, thereby permitting the mechanical connection of the plug 105 and socket 110. Alternatively, if a user attempts to connect an inferior plug (e.g., a plug without the predetermined shaped recess, not shown), the protrusion 120 of the electrical socket 110 will not mate with the inferior plug, thereby preventing the mechanical connection of the inferior plug and socket 110.

Additionally, in some embodiments, the plug and socket assembly 100 includes an interlock mechanism 130. The interlock mechanism 130 includes a variety of mechanically-interlocking features (e.g., protrusions, recess, notches, linkages, tabs, actuators) associated with the plug 105 and the socket 110. The mechanically-interlocking features are configured to selectively engage and disengage with each other or with other structure of the plug and socket assembly 100. Depending on the relative position of the plug 105 and the socket 110, the interlock mechanism 130 mechanically permits and prevents the connection and disconnection of the plug 105 to and from the socket 110.

For example, the interlock mechanism 130 includes the collar 106 of the plug 105. The collar 106 is configured to mechanically interlock with a mating conduit 131 of the receptacle portion 113 of the socket 110. The interlock mechanism 130 further includes the flange 107 of the plug 105 which is configured to mechanically interlock with a lip 132 of the socket 110. The flange 107 and the lip 132 engage based on a mating male-female bayonet-type mechanical connection. In one position, bayonet tabs on the flange 107 abut bayonet tabs on the lip 132 such that the flange 107 and the lip 132 are fastened to prevent disconnection of the plug 105 from the socket 110. In another position, the bayonet tabs on the flange 107 pass through bayonet tabs on the lip 132 such that the flange 107 and the lip 132 are unfastened to allow disconnection of the plug 105 from the socket 110.

To control the energization of the plug and socket assembly 100, a manual electrical switch (not shown) may be used to selectively make and break an electrical circuit connecting the power source (not shown) and the electrical socket 110 with the load source (not shown) of the plug 105. For example, a user may manually control the manual electrical switch by operating a control device (e.g., working a lever, rotating a knob, pushing a button) to selectively make and break the electrical circuit by which the power source supplies electrical current to the load source through the plug 105 and socket 110.

Figure 8:
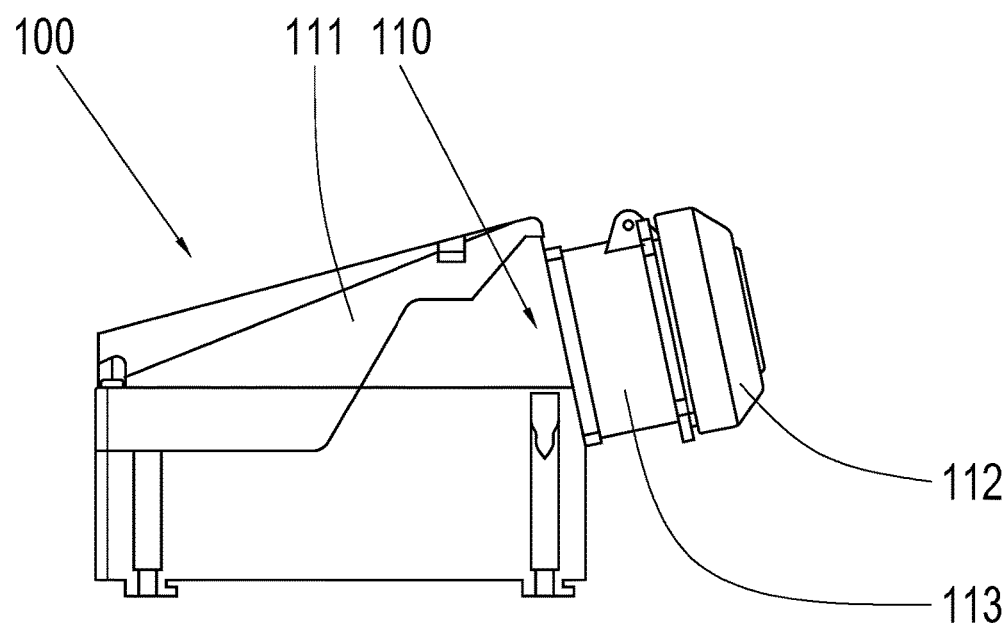
FIG. 8 illustrates a side view of the socket of FIG. 3.
Figure 9:
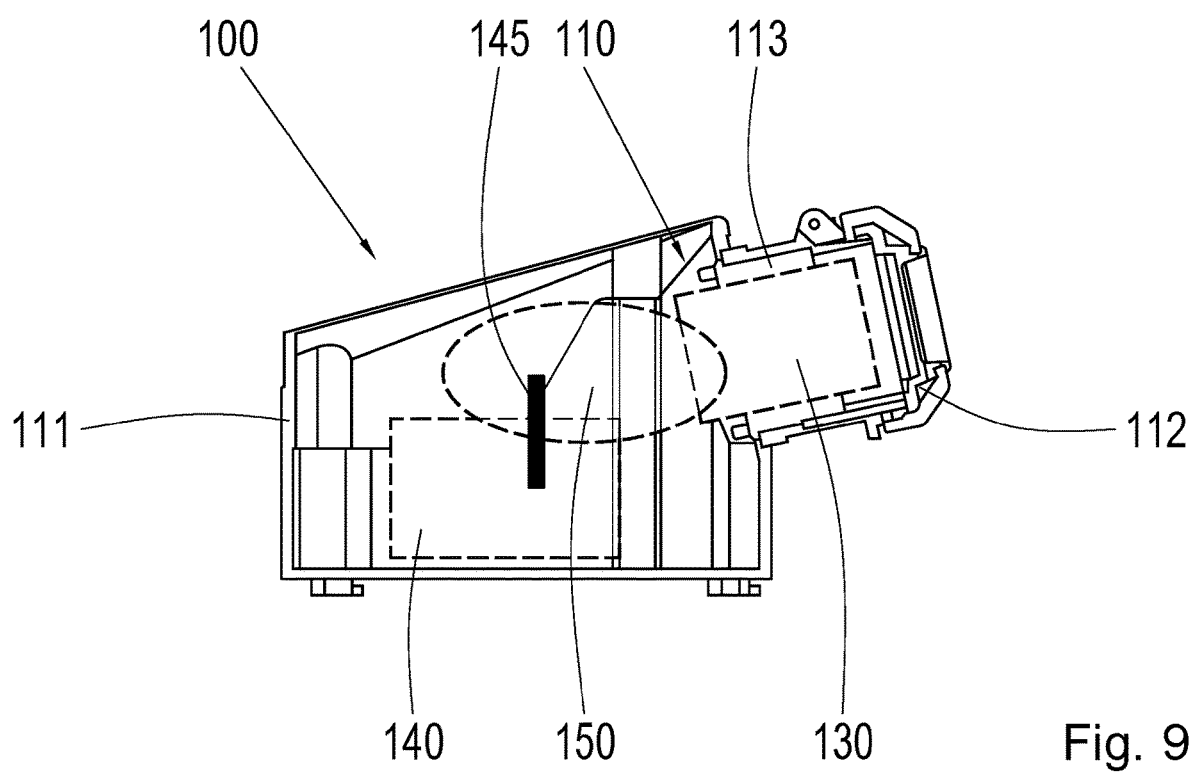
FIG. 9 illustrates a cross-sectional side view of the socket of FIG. 8 including schematic representations of an interlock mechanism and an integrated electrical switch.

With reference to FIG. 8 and FIG. 9, in the illustrated embodiment, the plug and socket assembly 100 includes an integrated electrical switch 140 configured to interact with the interlock mechanism 130. FIG. 8 shows a side view of the electrical socket 110, and FIG. 9 shows a cross-section of the same view. For purposes of explanation and not limitation, in FIG. 9, the interlock mechanism 130 is schematically represented as rectangle 130, and the integrated electrical switch 140 is schematically represented as rectangle 140.

The assembly 100 further includes a transfer mechanism 150 connecting the actuator 145 of the integrated electrical switch 140 to the interlock mechanism 130. When a user moves the plug 105 in the socket 110 in a prescribed manner, such movement causes the transfer mechanism 150 to actuate or de-actuate the actuator 145 of the integrated electrical switch 140. The interlock mechanism 130 interacts with the electrical switch 140 through the transfer mechanism 150 to ensure the socket 110 is energized only when the plug 105 is connected to the socket 110.

The interlock mechanism 130 operates based on one or more movements or a combination of movements dictated, for example, by the relative positioning of the plug 105 and the socket 110. Similarly, the integrated electrical switch 140 can operate based on one or more movements or a combination of movements dictated, for example, by the relative positioning of the interlock mechanism 130 and the actuator 145 of the integrated electrical switch 140. Rotation of the plug 105 relative to the socket 110 controls the positioning and movement of one or more components of the interlock mechanism 130. In turn, the positioning and movement of the one or more components of the interlock mechanism 130 are transferred by the transfer mechanism 150 to control the positioning and movement of the actuator 145 of the switch 140.

Rotation is one exemplary way in which the interlock mechanism 130 operates the actuator 145 of the integrated electrical switch 140 to energize and de-energize the socket 110. Other exemplary options include linear motion, rocking motion, pushing or pulling, depressing the actuator 145, or other mechanical movement configured to operate the actuator 145 of the electrical switch 110 with the interlock mechanism 130 based on relative positioning of the plug 105 and the socket 110.

Figure 10:
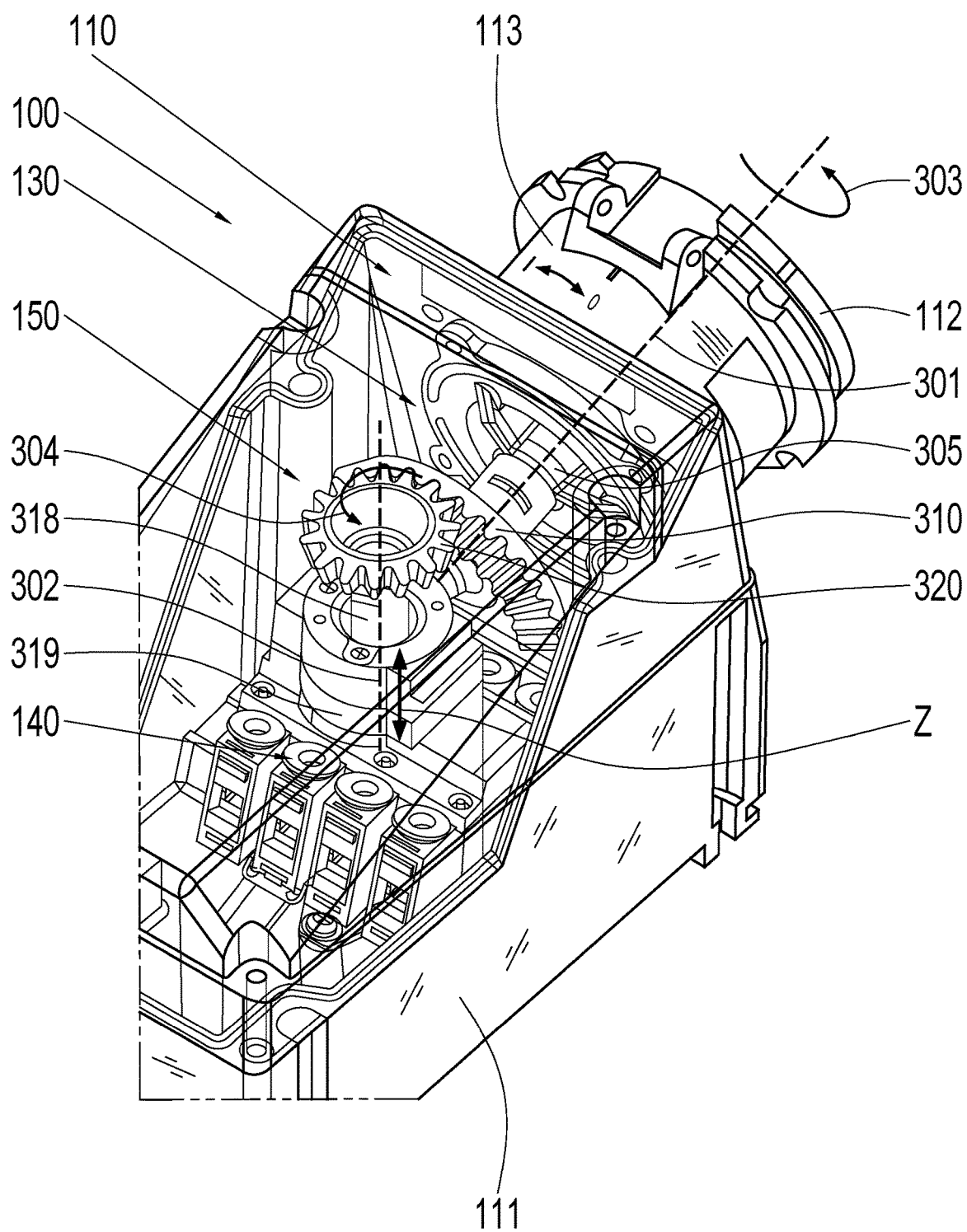
FIG. 10 shows a rear perspective view of the socket of FIG. 9 with a portion of the housing of the socket shown as transparent for clarity.

FIG. 10 shows the plug and socket assembly 100 with a portion of the housing 111 of the socket 110 illustrated as transparent to provide a view of the interlock mechanism 130, the integrated electrical switch 140, and the transfer mechanism 150 in the socket 110. The plug and socket assembly 100 are operable based on a first predetermined degree of rotation "X" (see FIG. 5) of the plug 105 in a first direction 303 about a first rotation axis 301. The assembly 100 includes an interlock mechanism 130 that converts the first predetermined degree of rotation "X" of the plug 105 in the first direction 303 into a second predetermined degree of rotation "Y" (See FIG. 11 and FIG. 12) of a cam 325 (See FIG. 13 and FIG. 14) in a second direction 304 about a second rotation axis 302 oriented relative to the first rotation axis 301.

The first predetermined degree of rotation "X" can be different from the second predetermined degree of rotation "Y". For example, the first predetermined degree of rotation "X" can be about 45 degrees and the second predetermined degree of rotation "Y" can be about 90 degrees, although other values can be selected without departing from the scope of the disclosure. The first direction 303 can be opposite the second direction 304. For example, the first direction 303 can be clock-wise and the second direction 304 can be counterclockwise. The cam 325 is operable to control the actuator 145 (schematically shown in FIG. 9) of the electrical switch 140 with a linear motion "Z" in a direction parallel to the second axis 302 to energize and de-energize the socket 110.

Thus, rotation of the plug 105 as shown by arrow 303, once connected to the socket 110, can simultaneously control the actuator 145 of the electrical switch 140 to make the electrical circuit, energize the electrical socket 110, and supply electrical current from the power source (not shown) to the load source (not shown) through the connected plug 105 and socket 110. Likewise, rotation of the plug 105 (e.g., in an opposite direction as shown by arrow 306) when connected to the socket 110, can simultaneously control the actuator 145 of the electrical switch 140 to break the electrical circuit, de-energize the electrical socket 110, and permit safe disconnection of the plug 105 from the socket 110.

In the embodiment shown in FIG. 10, the interlock mechanism 130 includes a stationary transition piece 305 that interacts with a rotatable locking mechanism (not shown). The rotatable locking mechanism is a mating bayonet connection that rotates about the first axis 301 relative to the transition piece 305 based on rotation of the plug 105 about the first axis 301. When the plug 105 is connected to the socket 110 and rotated 45 degrees clock-wise about the first axis 301, the first tabs of the bayonet connection that are connected to the socket 110 abut second tabs of the bayonet connection that are connected to the plug 105. In this configuration, the rotatable locking mechanism 130 prevents disconnection of the plug 105 from the socket 110. Likewise, when the plug 105 is rotated 45 degrees counter-clockwise about the first axis 301, the first and second tabs are positioned to pass each other, rather than abut, such that the rotatable locking mechanism permits disconnection of the plug 105 from the socket 110.

The transfer mechanism 150 includes one or more gears, linkages, springs, cams, pins, control shafts or other mechanical mechanisms that transfer or convert a predetermined manipulation of the plug 105 into a predetermined movement of the interlock mechanism 130 that transfers or converts the predetermined movement into an operation controlling the actuator 145 of the integrated electrical switch 140.

Figure 11:
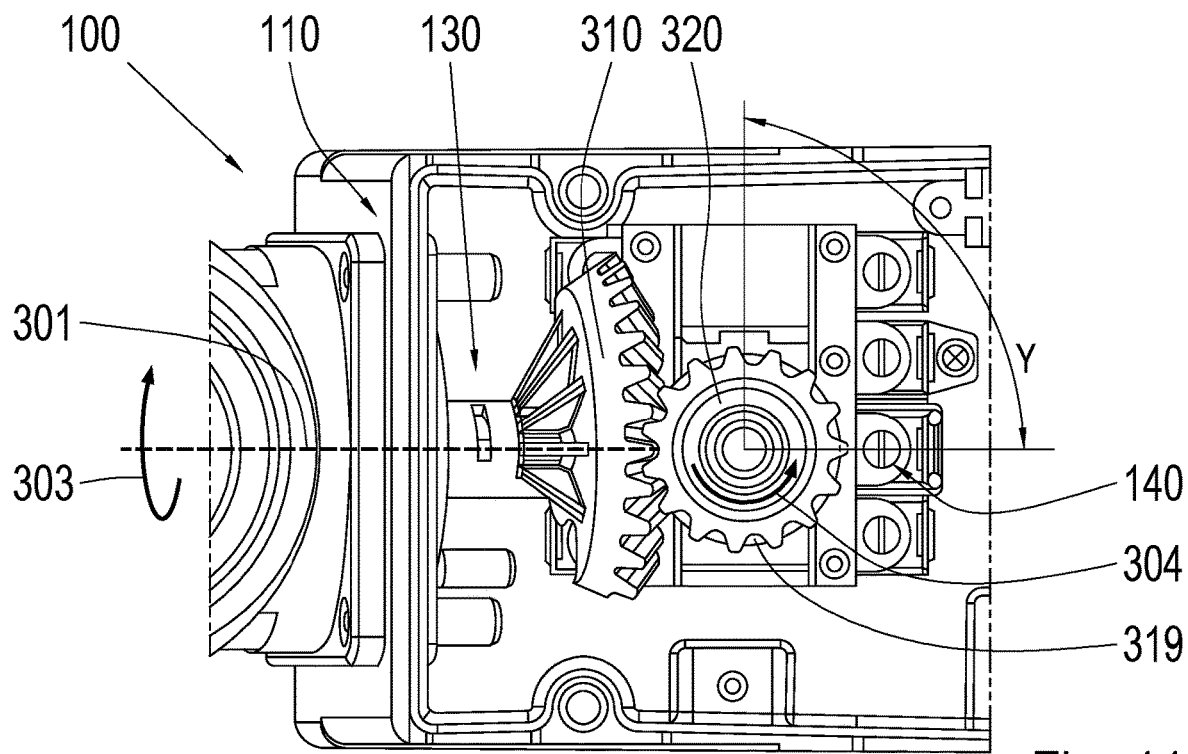
FIG. 11 shows a top view of a cut-away of the socket of FIG. 10 with a first gear and a second gear in a first position in which the electrical switch is de-energized.
Figure 12:
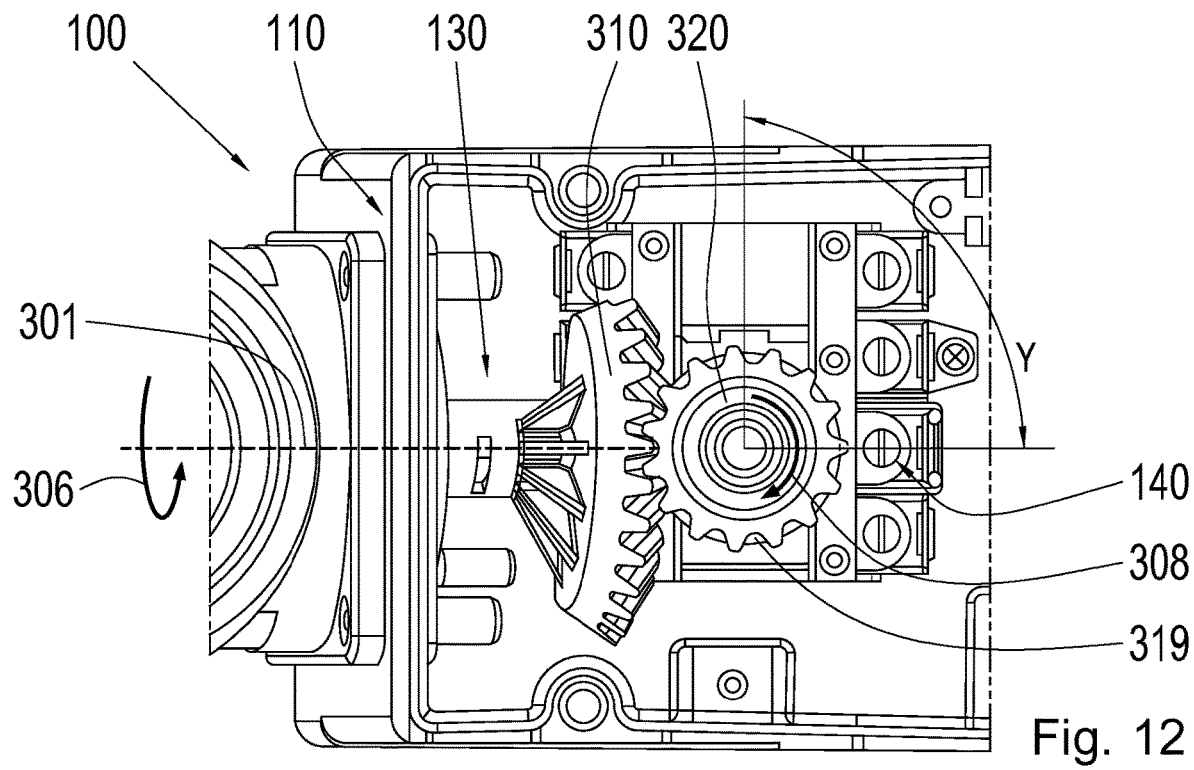
FIG. 12 shows the top view of the cut-away of the socket of FIG. 11 with the first gear and the second gear in a second position in which the electrical switch is energized.

In the embodiment shown in FIGS. 10-14, the transfer mechanism 150 (FIG. 9) includes first mechanical component 310, second mechanical component 320, and third mechanical component 325. Specifically, a first gear 310 is rotatably mounted on the transition piece 305 and is rotated about the first axis 301 in accordance with the rotation of the plug 105 (arrow 303 or arrow 306). As illustrated in FIGS. 10-12, as the first gear 310 rotates in the first direction 303 about the first axis 301, teeth of the first gear 310 mesh with teeth of a second gear 320, causing the second gear 320 to rotate in the second direction 304 about the second axis 302. The second gear 320 is mounted to a mounting bracket 318. In the illustrated embodiment, the first gear 310 is a bevel gear and the second gear 320 is a bevel gear. The gearing ratios of the first bevel gear 310 and the second bevel gear 320 are selected such that a 45 degree clock-wise rotation of the first bevel gear 310 about the first axis 301 causes the second bevel gear 320 to rotate 90 degrees counter-clockwise about the second axis 302.

The first axis 301 is oriented at a non-parallel angle relative to the second axis 302. In alternative embodiments, the first axis 301 can be oriented relative to the second axis 302 at an angle within a range of about 45 degrees to 135 degrees, although other angles can be provided. In the illustrated embodiment, the first axis 301 is perpendicular 302 to the second axis 302. Although described as a 45 degree rotation of the plug 105 causing a 90 degree rotation of the second bevel gear 320, it should be understood that other rotation angles and gearing ratios can be employed without departing from the scope of the disclosure.

Figure 13:
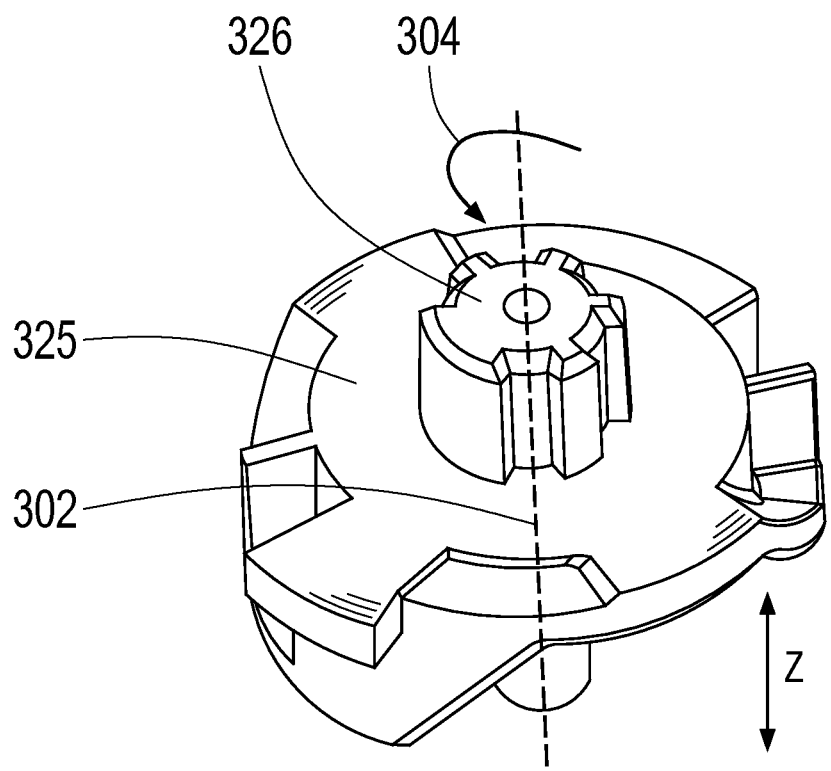
FIG. 13 shows a top perspective view of a cam configured to operate the actuator of the electrical switch.
Figure 14:
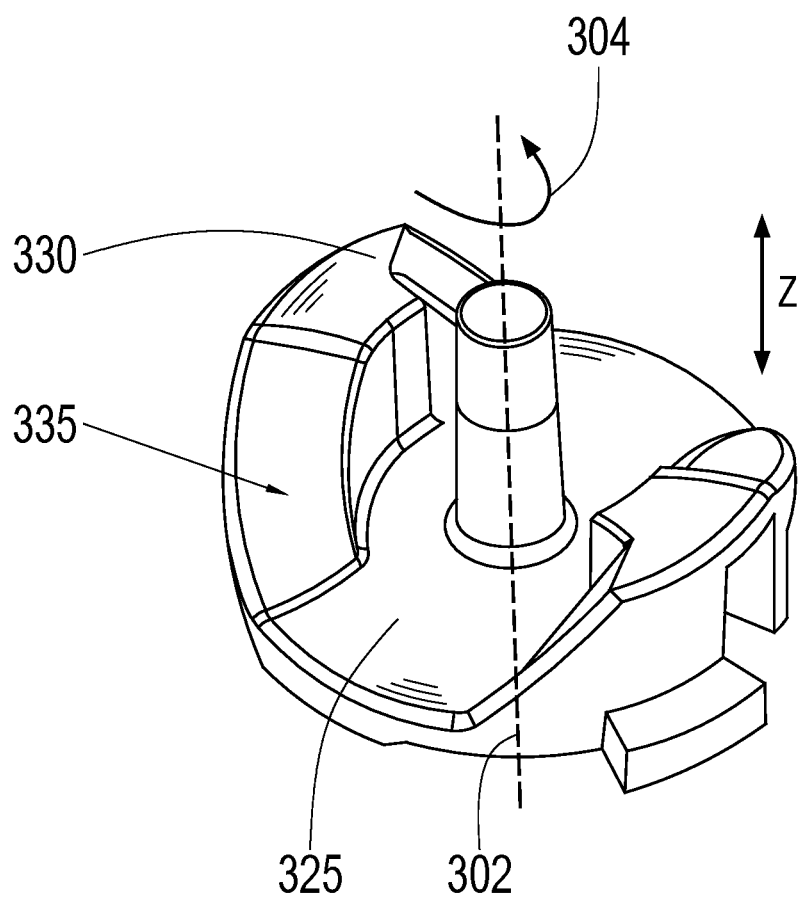
FIG. 14 shows a bottom perspective view of the cam of FIG. 13 including a ramp having an inclined surface.

In FIGS. 10-12, the cam 325 is not visible because it is mounted within sleeve 319 as is the actuator 145. Thus, FIG. 13 and FIG. 14 show the cam 325 with the sleeve 319 and other components removed for clarity. The second bevel gear 320 is coupled to the cam 325 at coupler 326 such that rotation of the second bevel gear 320 in the second direction 304 about the second axis 302 causes the cam 325 to rotate in the same direction. As shown in FIG. 14, the cam 325 includes a ramp 330 having an inclined surface 335 that is configured to contact the actuator 145 of the integrated electrical switch 140 and operate the actuator up and down in direction "Z." The cam 325 includes two ramps 330, 331 arranged approximately 180 degrees radially from each other. Each ramp 330, 331 includes an inclined surface 335, 336.

Accordingly, rotation of the cam 325 about the second axis 302 can operate the actuator 145 to energize and de-energize the electrical switch 140. For example, based on the first bevel gear 310, the second bevel gear 320, and the shaft 311, rotation of the plug 105 45 degrees in a clock-wise direction (arrow 303) causes the cam 325 to rotate 90 degrees in a counter clock-wise direction (arrow 304). The inclined surface 335, 336 of one of the ramps 330, 331 depresses the actuator 145 and energizes the electrical switch 140. Likewise, based on the first bevel gear 310, the second bevel gear 320, and the shaft 311, rotation of the plug 105 45 degrees in a counter-clock-wise direction (arrow 306) causes the cam 325 to rotate 90 degrees in a clockwise direction (arrow 308). The inclined surface 335, 336 of one of the ramps 330, 331 depresses the actuator 145 and de-energizes the electrical switch 140.

Additionally, the interlock mechanism 130 interacts with the electrical switch 140 to prevent the plug 105 from being disconnected from the socket 110 unless the socket 110 is de-energized. Accordingly, as a safety feature, the electrical socket 110 with an integrated electrical switch 140 can reduce the likelihood of user misuse or error when operating the plug and socket assembly 100.

Figure 15:
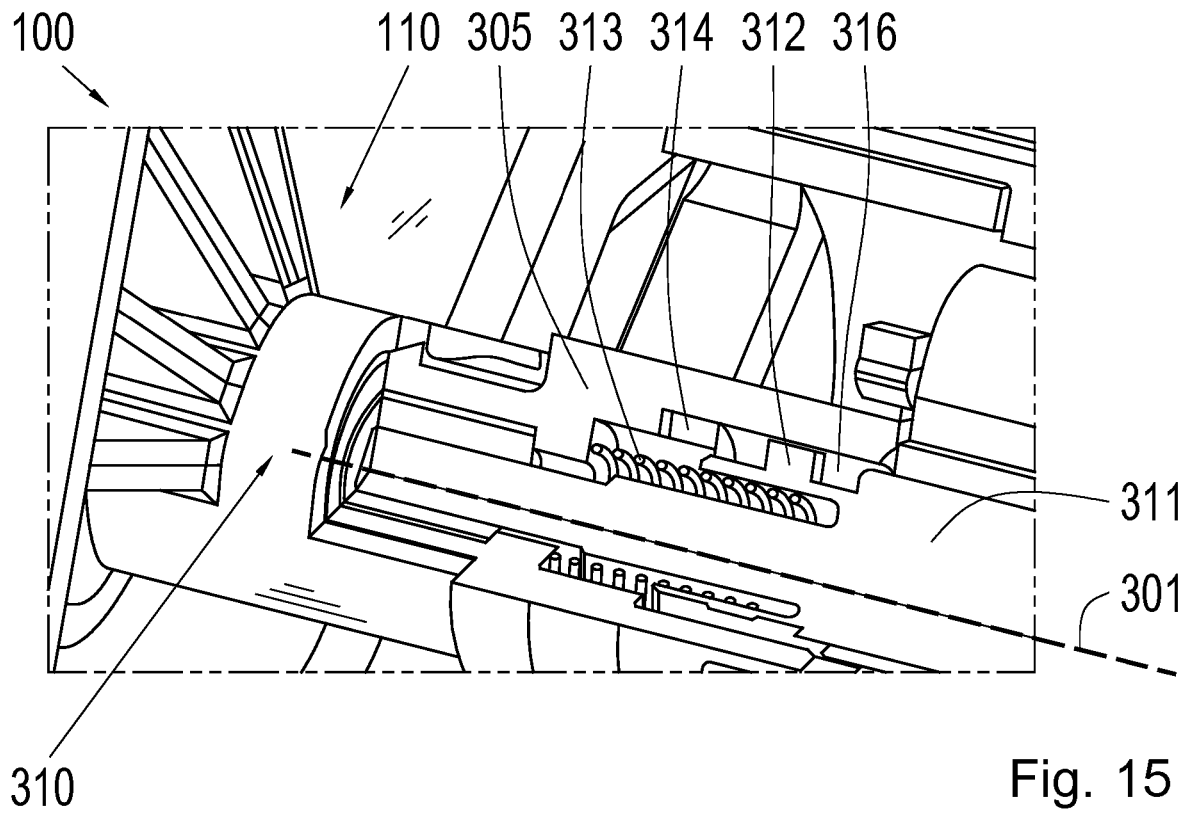
FIG. 15 shows a partial cut-away view of the socket of FIG. 10 including a rotatable shaft positioned to rotate with the plug.
Figure 16:
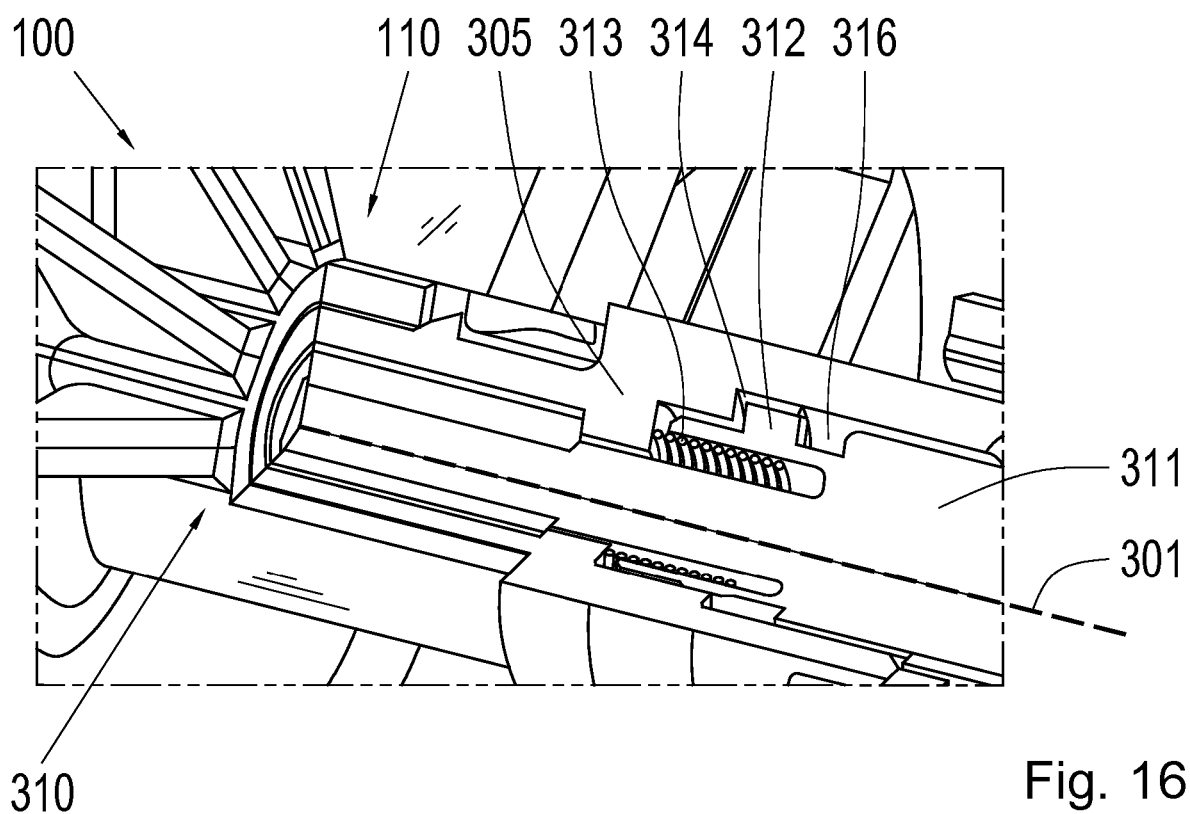
FIG. 16 shows the partial cut-away view of the socket of FIG. 10 with the rotatable shaft positioned to abut a blocking member that prevents rotation of the plug.

As illustrated in FIG. 15 and FIG. 16, a spring 313 biases a shaft 311 into a predetermined axial position along the first axis 301. For orientation, in FIGS. 15 and 16, although not shown in the figure, the receptacle portion 113 of the socket 110 is on the right-hand side of the figure. Thus, in the position shown in FIG. 15, the spring 313 biases the shaft 311 to the right (toward the receptacle portion 113). In this position, the shaft 311 defines the protrusion 120 (FIG. 5) that extends from the face of the receptacle portion along the first rotation axis 301. As noted, the protrusion 120 mates with the recess 115 (FIG. 7) on the plug 105, such that when the plug 105 rotates, the shaft 311 rotates. The shaft 311 is also coupled to the first gear 310 and rotates the first gear 310 in the same rotation direction as the plug 105 about the first axis 301.

As illustrated in FIG. 15, the shaft 311 includes a tab 312 and the stationary piece 305 includes a blocking member 314 formed on an annular cavity of the stationary piece 305. When the tension spring 313 biases the shaft 311 such that the protrusion 120 (FIG. 5) extends outward away from the face of the receptacle portion 113, the tab 312 on the shaft 311 is positioned to avoid contact with the blocking member 314. Thus, when the plug 105 having the proper predetermined recess 115 (FIG. 7) is employed, the shaft 311 is rotatable about axis 301 because the tab 312 of the shaft 311 avoids contact with the blocking member 314 and instead rotates within a channel 316. Accordingly, when a proper plug 105 is employed and the shaft 311 is in this position, the plug 105, shaft 311, and mechanical component 310 rotate together when the plug 105 rotates.

FIG. 16 illustrates that when an inferior plug (without a recess) is employed, the inferior plug pushes the shaft 311 and compresses the spring 313 along the first axis 301. When shaft 311 is pushed by an inferior plug and the spring 313 is compressed, the blocking member 314 abuts the tab 312 which prevents the shaft 311 from rotating about the first axis 301. Accordingly, when an inferior plug is employed and the shaft 311 is in this position, the plug 105 and shaft 311 cannot rotate because the tab 312 abuts the blocking member 314. Thus, because the shaft 311 cannot rotate, the mechanical component 310 does not rotate, and because the mechanical component 310 does not rotate, the energization of the electrical switch 140 cannot change. As a safety feature, any attempt to connect an inferior plug to the socket 110 renders the assembly temporarily unusable.

Figure 17:
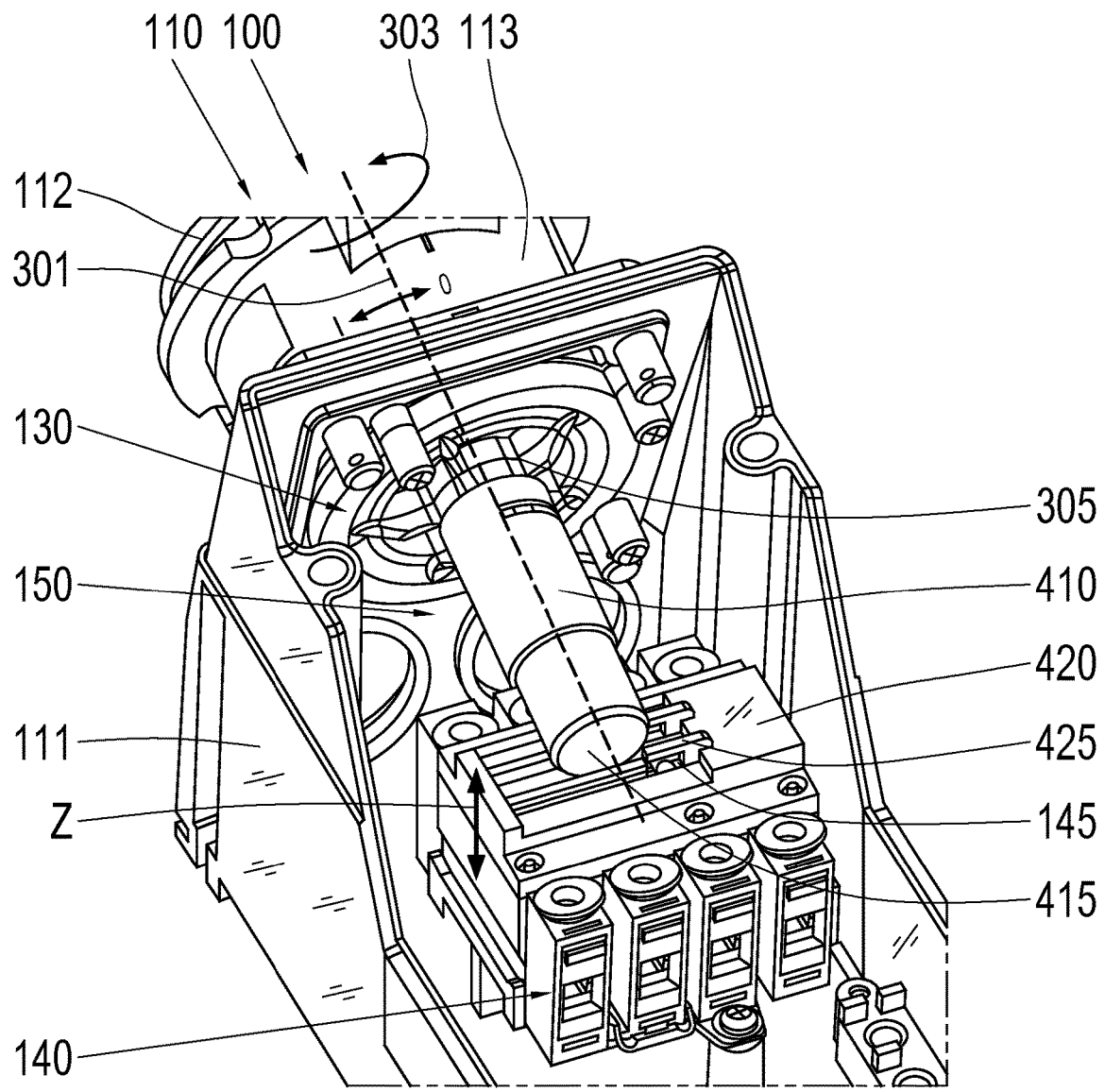
FIG. 17 shows a partial cut-away view of a socket including an alternative embodiment of a transfer mechanism configured to operate an actuator to de-energize and electrical switch.
Figure 18:
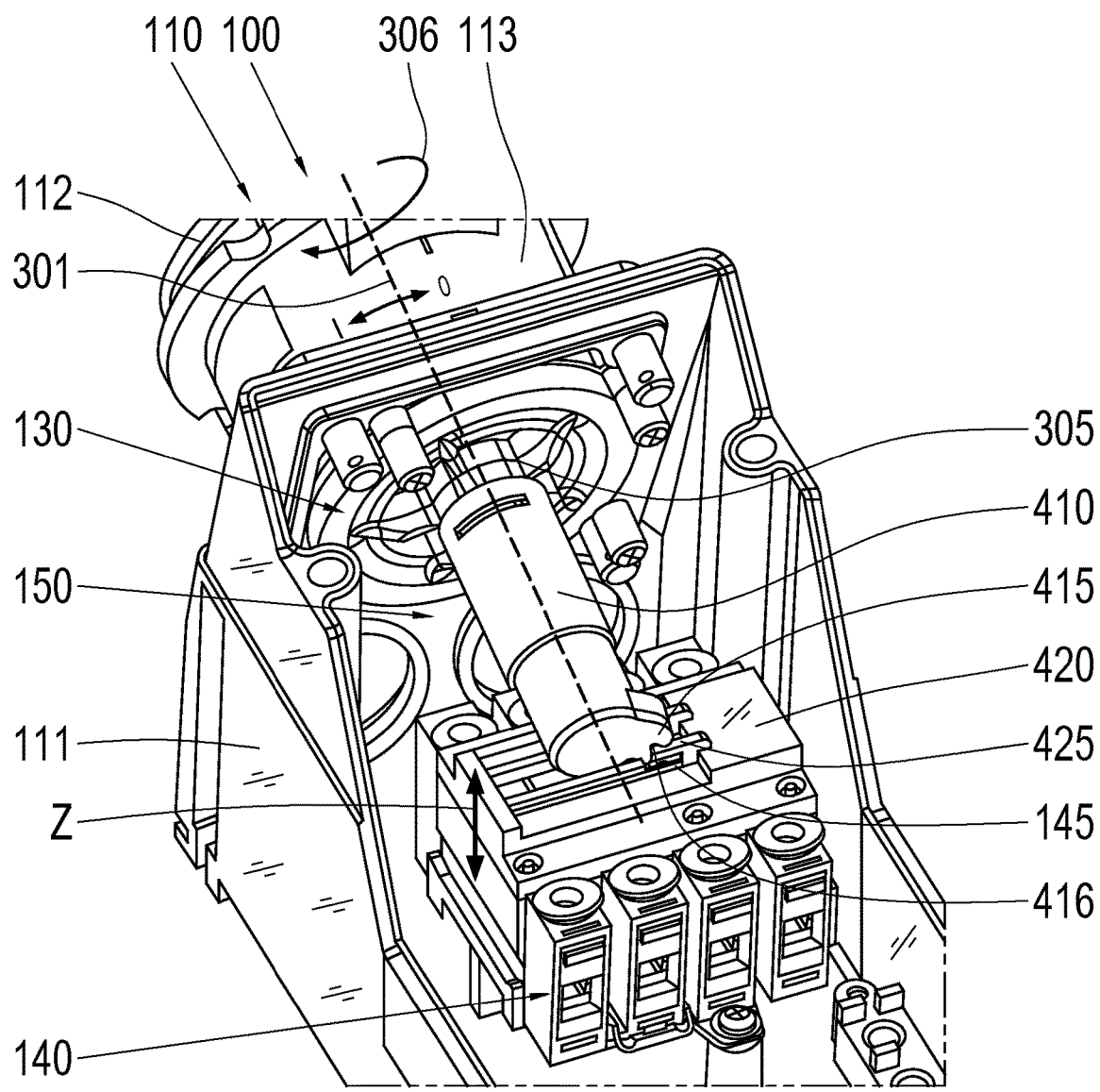
FIG. 18 shows the partial cut-away view of the socket of FIG. 17 with the transfer mechanism configured to operate the actuator to energize the electrical switch.

FIGS. 17-18 show another embodiment of transfer mechanism 150 (FIG. 9). The transfer mechanism 150 includes a coupler 410 having a cam 415. The coupler 410 is rotatably mounted on the transition piece 305 and is rotated about the first axis 301 in accordance with the rotation of the plug 105 (arrow 303 or arrow 306). The coupler 410 couples the cam 415 and rotates the cam 415 in the same rotation direction as the plug 105 about the first axis 301. The actuator 145 of the electrical switch 140 is movable in the Z direction and is positioned within a cover 420 that guides this movement. The actuator 145 is biased (e.g., by one or more springs, not shown) in the Z direction away from the electrical switch 140. The cover 420 includes an aperture 421 through which the cam 415 extends to contact the actuator 145.

In FIG. 17, the cam 415 is positioned to contact the actuator 145 and move the actuator 145 towards the electrical switch 140 opposing the biasing force of the actuator 145. When the actuator 145 is depressed, electrical contact of the electrical switch 140 opens and the electrical switch 140 de-energizes. As shown in FIG. 18, rotation of the coupler 410 and cam 415 about axis 301 in an opposite direction (shown by arrow 306), causes the cam 415 to rotate away from the electrical switch 140. As the cam 415 moves away, the biasing force of the spring pushes the actuator 145 away from the electrical switch 140. As such, electrical contact of the electrical switch 140 is closed and the electrical switch 140 is energized. Without departing from the scope of the disclosure, the same operation (e.g., rotation) could be reversed such that the electrical switch 140 is energized when the actuator 145 is depressed and de-energized when the actuator 145 is open.

The cover 420 includes a latch 425 that engages the cam 415 when the cam 415 is in the position shown in FIG. 18. The latch 425 can include flexible fingers that engage a recess 416 on the cam 415 to hold the cam 415 in position such that the actuator 145 is not inadvertently activated. In other embodiments, the latch 425 can be a bar or other protrusion that engages the cam 415.

Thus, the transfer mechanism 150 transfers or converts a predetermined manipulation of the plug 105 into a predetermined movement of the interlock mechanism 130 that transfers or converts the predetermined movement into an operation controlling the actuator 145 of the integrated electrical switch 140. Accordingly, the present disclosure provides a plug and socket assembly 100 including a plug 105 and socket 110 having features that can be provided either alone or in combination to facilitate safe and effective electrical distribution while achieving advantages that cannot be obtained by known plug and socket assemblies.

The plug 105 and socket 110 can be manufactured in a variety of shapes and sizes, without departing from the scope of the disclosure. Further, the plug and socket assembly 100 can be employed in a variety of locations where electrical distribution is desired including factories, commercial buildings, industrial facilities, and residential applications. Additionally, plug and socket assembly 100 can be employed indoors or outdoors and can be provided for permanent installation (e.g., in a building) or for temporary installation (e.g., at a construction site). Unless otherwise noted, the plug and socket assembly 100 of the present disclosure can be employed with a variety of electronic devices, electrical devices, and electromechanical devices and can include a variety of electrical components. Example electrical components include, but are not limited to, wires, capacitors, inductors, transformers, reducers, amplifiers, fuses, switches, connectors, detectors, sensors, transducers, resonators, semiconductors, cables, timers, tubes, suppressors, terminals.

The plug 105 and socket 110 can be manufactured from a metallic, plastic, polymeric or other suitable material to protect the electrical components from a variety of external forces, elements, and contact. Moreover, the housing 111 can be provided in a variety of shapes (e.g., rectangular, cuboidal, polyhedron, etc.) and sizes (e.g., small, medium, large) without departing from the scope of the disclosure.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A plug and socket assembly comprising:
a socket having a housing and a receptacle portion configured to receive an electrical plug;
an interlock mechanism configured to lock the electrical plug in the receptacle portion when the receptacle portion is rotated about a first axis to a first position;
an electrical switch including an actuator operable to energize and de-energize the socket; and
a transfer mechanism configured to operate the actuator, wherein the transfer mechanism includes:
a first mechanical component inside of the housing, the first mechanical component being rotatable in a first direction about the first axis, and
a second mechanical component inside of the housing engaged with the first mechanical component, the second mechanical component being rotatable in a second direction about a second axis oriented at an angle relative to the first axis.

2. The plug and socket assembly of claim 1, wherein the first mechanical component includes a cam configured to operate the actuator.

3. The plug and socket assembly of claim 1, including a third mechanical component engaged with the second mechanical component, wherein the second mechanical component is operable to transfer the motion of the first mechanical component into motion of the third mechanical component that operates the actuator.

4. The plug and socket assembly of claim 3, wherein the third mechanical component is configured to linearly operate the actuator.

5. The plug and socket assembly of claim 3, wherein the third mechanical component is a cam that includes a ramp having an inclined surface, wherein the inclined surface is configured to contact the actuator of the electrical switch based on the motion of the second mechanical component.

6. The plug and socket assembly of claim 1, wherein the interlock mechanism includes a shaft rotatable about the first axis based on the rotation of the receptacle portion, and wherein the first mechanical component is coupled to the shaft.

7. The plug and socket assembly of claim 6, wherein the shaft includes a protrusion extending outward from the receptacle portion of the socket, and wherein the protrusion has a predetermined shape selected to mate with a corresponding recess on the plug.

8. The plug and socket assembly of claim 7, further comprising a spring that biases the shaft along the first axis, wherein the shaft includes a tab that abuts a blocking member of the socket when the shaft is positioned in a first axial position along the first axis, the blocking member preventing rotation of the shaft about the first axis.

9. The plug and socket assembly of claim 8, wherein the tab is configured to travel in a channel of the socket when the shaft is positioned in a second axial position along the first axis, and wherein the channel allows rotation of the rotatable shaft about the first axis.

10. A method of operating a plug and socket assembly, comprising:
- providing a socket having a housing and a receptacle portion;
- connecting a plug to the receptacle portion of the socket;
- rotating the plug in a first direction about a first axis;
- wherein the rotating rotates a first mechanical component inside the housing in the first direction about the first axis and a second mechanical component inside the housing in a second direction about a second axis oriented at an angle relative to the first axis;
- wherein rotation of the second mechanical component rotates a third mechanical component in the second direction about the second axis; and
- wherein the third mechanical component operates an actuator of an electrical switch to energize and de-energize the socket.

11. The method of claim 10, wherein the third mechanical component linearly operates the actuator.

* * * * *